United States Patent
Suzuki

(10) Patent No.: US 8,843,868 B2
(45) Date of Patent: Sep. 23, 2014

(54) METHOD FOR ASSIGNING TERMINAL OF SEMICONDUCTOR PACKAGE, APPARATUS, AND SEMICONDUCTOR PACKAGE

(71) Applicant: Fujitsu Limited, Kawasaki (JP)

(72) Inventor: Keisuke Suzuki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/889,746

(22) Filed: May 8, 2013

(65) Prior Publication Data

US 2013/0246993 A1    Sep. 19, 2013

Related U.S. Application Data

(63) Continuation of application No. PCT/JP2010/006596, filed on Nov. 10, 2010.

(51) Int. Cl.
  *G06F 17/50*    (2006.01)
  *H01L 23/50*    (2006.01)
  *H01L 23/498*   (2006.01)

(52) U.S. Cl.
  CPC ............ *G06F 17/5072* (2013.01); *H01L 23/50* (2013.01); *G06F 2217/40* (2013.01); *H01L 23/49816* (2013.01); *H01L 2924/0002* (2013.01); *G06F 17/5068* (2013.01)
  USPC ............ 716/122; 716/126; 716/129; 716/130

(58) Field of Classification Search
  CPC ............ G06F 17/5072; G06F 17/5068; G06F 17/5077; G06F 17/5081; G06F 17/505; G06F 17/5054; H05K 3/0005; H05K 2201/10734; H05K 2201/09227; H01L 2224/48247; H01L 2224/49171; H01L 2924/15311; H01L 2224/48227
  USPC ............................. 716/122, 126, 129, 130
  See application file for complete search history.

(56) References Cited

U.S. PATENT DOCUMENTS 5,856,927 A * 1/1999 Greidinger et al. ........... 716/122
6,851,100 B1   2/2005 You et al.
(Continued)

FOREIGN PATENT DOCUMENTS

| JP | 2002-289636 | 10/2002 |
| JP | 2003-282603 | 10/2003 |
| JP | 2008-40801  | 2/2008  |

OTHER PUBLICATIONS

International Search Report, mailed in connection with PCT/JP2010/006596 and mailed Dec. 7, 2010.

(Continued)

*Primary Examiner* — Vuthe Siek
(74) *Attorney, Agent, or Firm* — Fujitsu Patent Center

(57) ABSTRACT

An assignment method of terminals of a semiconductor package executed by an assignment supporting apparatus includes: deciding a maximum allowable distance to be a constraint condition regarding a relative distance between each of the pads and a terminal to be assigned to the pad, and extracting one or a plurality of assigned terminal candidates for each of the pads so that the relative distance between each of the pads and a terminal selected for the pad falls within a range of the maximum allowable distance; and deciding one of the terminals as a assigned terminal based on the assigned terminal candidates and assigning the one of the terminals to one of the pads. The process is a process to assign one of the terminals with priority to a pad having a smallest number of assigned terminal candidates in a not-assigned condition based on the assigned terminal candidates.

14 Claims, 20 Drawing Sheets

(56) References Cited

U.S. PATENT DOCUMENTS

| | | | | |
|---|---|---|---|---|
| 2002/0158341 | A1* | 10/2002 | Murayama | 257/780 |
| 2004/0004293 | A1* | 1/2004 | Murayama | 257/780 |
| 2005/0230823 | A1* | 10/2005 | Ohsaka | 257/735 |
| 2009/0051015 | A1* | 2/2009 | Ohsaka | 257/664 |
| 2011/0057302 | A1* | 3/2011 | Spehar et al. | 257/693 |
| 2013/0268909 | A1* | 10/2013 | Spehar et al. | 716/132 |

OTHER PUBLICATIONS

PCT Notification of Transmittal of Translation of the International Preliminary Report on Patentability dated May 23, 2013, in connection with PCT/JP2010/006596.

* cited by examiner

| PAD NUMBER | ELECTRICAL CHARACTERISTIC | |
|---|---|---|
| | X COORDINATE (μm) | Y COORDINATE (μm) |
| 1 | −2000 | 1900 |
| 2 | −2000 | 1800 |
| 3 | −2000 | 1700 |
| 4 | −2000 | 1600 |
| 5 | −2000 | 1500 |
| 6 | −2000 | 1400 |
| 7 | −2000 | 1300 |
| 8 | −2000 | 1200 |
| 9 | −2000 | 1100 |

F I G. 6

| BALL NUMBER | BALL ARRANGEMENT COORDINATES ||
|---|---|---|
| | X COORDINATE ($\mu$m) | Y COORDINATE ($\mu$m) |
| A1 | −5000 | 5000 |
| A2 | −4000 | 5000 |
| A3 | −3000 | 5000 |
| B1 | −5000 | 4000 |
| B2 | −4000 | 4000 |
| B3 | −3000 | 4000 |
| C1 | −4000 | 3000 |
| C2 | −3000 | 3000 |
| C3 | −3000 | 2000 |

F I G. 7

| PAD NUMBER | PAD ARRANGEMENT COORDINATES | | |
|---|---|---|---|
| | L (nH) | C (pF) | R (mΩ) |
| 1 | 2.50 | – | – |
| 2 | 3.00 | – | – |
| 3 | – | – | 100 |
| 4 | – | – | – |
| 5 | – | – | 220 |
| 6 | – | – | – |
| 7 | – | – | – |
| 8 | – | – | – |
| 9 | 2.75 | – | 275 |

FIG. 8

| PAD NUMBER | ELECTRICAL CHARACTERISTIC ||| DISTANCE (μm) ||||
|---|---|---|---|---|---|---|---|
| | L(nH) | C(pF) | R(mΩ) | ΔL | ΔC | ΔR | Δr |
| 1 | 2.50 | – | – | 2500 | 4745 | 4745 | 2500 |
| 2 | 3.00 | – | – | 3000 | 4745 | 4745 | 3000 |
| 3 | – | – | 100 | 4745 | 4745 | 1176 | 1176 |
| 4 | – | – | – | 4745 | 4745 | 4745 | 4745 |
| 5 | – | – | 220 | 4745 | 4745 | 2588 | 2588 |
| 6 | – | – | – | 4745 | 4745 | 4745 | 4745 |
| 7 | – | – | – | 4745 | 4745 | 4745 | 4745 |
| 8 | – | – | – | 4745 | 4745 | 4745 | 4745 |
| 9 | 2.75 | – | 275 | 2750 | 4745 | 3235 | 2750 |

FIG. 9

| PAD NUMBER | CONDITION | NUMBER OF EFFECTIVE ITEM | NUMBER OF CANDIDATES | BALL NUMBER | RELATIVE DISTANCE (Δp) |
|---|---|---|---|---|---|
| 1 | 0 | 4 | 4 | B3 | 2326 |
|  | 0 |  |  | C2 | 2283 |
|  | 0 |  |  | C3 | 1487 |
|  | 0 |  |  | D3 | 1005 |
| 2 | 0 | 5 | 5 | B2 | 2973 |
|  | 0 |  |  | B3 | 2417 |
|  | 0 |  |  | C2 | 2332 |
|  | 0 |  |  | C3 | 1562 |
|  | 0 |  |  | D3 | 1020 |
| 3 | 0 | 1 | 1 | D3 | 1044 |
| 4 | 0 | 9 | 9 | A1 | 4534 |
|  | 0 |  |  | A2 | 3945 |
|  | 0 |  |  | A3 | 3544 |
|  | 0 |  |  | B1 | 3842 |
|  | 0 |  |  | B2 | 3124 |
|  | 0 |  |  | B3 | 2600 |
|  | 0 |  |  | C2 | 2441 |
|  | 0 |  |  | C3 | 1720 |
|  | 0 |  |  | D3 | 1077 |
| 5 | 0 | 3 | 3 | C2 | 2500 |
|  | 0 |  |  | C3 | 1803 |
|  | 0 |  |  | D3 | 1118 |
| 6 | 0 | 9 | 9 | A1 | 4689 |
|  | 0 |  |  | A2 | 4118 |
|  | 0 |  |  | A3 | 3736 |
|  | 0 |  |  | B1 | 3970 |
|  | 0 |  |  | B2 | 3280 |
|  | 0 |  |  | B3 | 2786 |
|  | 0 |  |  | C2 | 2561 |
|  | 0 |  |  | C3 | 1887 |
|  | 0 |  |  | D3 | 1166 |
| 7 | 0 | 8 | 8 | A2 | 4206 |
|  | 0 |  |  | A3 | 3833 |
|  | 0 |  |  | B1 | 4036 |
|  | 0 |  |  | B2 | 3360 |
|  | 0 |  |  | B3 | 2879 |
|  | 0 |  |  | C2 | 2625 |
|  | 0 |  |  | C3 | 1972 |
|  | 0 |  |  | D3 | 1221 |

F I G. 1 0 A

| PAD NUMBER | CONDITION | NUMBER OF EFFECTIVE ITEM | NUMBER OF CANDIDATES | BALL NUMBER | RELATIVE DISTANCE (Δp) |
|---|---|---|---|---|---|
| 8 | 0 | 8 | 8 | A2 | 4294 |
|   | 0 |   |   | A3 | 3929 |
|   | 0 |   |   | B1 | 4104 |
|   | 0 |   |   | B2 | 3441 |
|   | 0 |   |   | B3 | 2973 |
|   | 0 |   |   | C2 | 2691 |
|   | 0 |   |   | C3 | 2059 |
|   | 0 |   |   | D3 | 1281 |
| 9 | 0 | 2 | 2 | C3 | 2147 |
|   | 0 |   |   | D3 | 1345 |

F I G. 1 0 B

| PAD NUMBER | CONDITION | NUMBER OF EFFECTIVE ITEM | NUMBER OF CANDIDATES | BALL NUMBER | RELATIVE DISTANCE (Δp) |
|---|---|---|---|---|---|
| 1 | 0 | 3 | 4 | B3 | 2326 |
|   | 0 |   |   | C2 | 2283 |
|   | 0 |   |   | C3 | 1487 |
|   | - |   |   | D3 | 1005 |
| 2 | 0 | 4 | 5 | B2 | 2973 |
|   | 0 |   |   | B3 | 2417 |
|   | 0 |   |   | C2 | 2332 |
|   | 0 |   |   | C3 | 1562 |
|   | - |   |   | D3 | 1020 |
| 3 | 1 | 0 | 1 | D3 | 1044 |
| 4 | 0 | 8 | 9 | A1 | 4534 |
|   | 0 |   |   | A2 | 3945 |
|   | 0 |   |   | A3 | 3544 |
|   | 0 |   |   | B1 | 3842 |
|   | 0 |   |   | B2 | 3124 |
|   | 0 |   |   | B3 | 2600 |
|   | 0 |   |   | C2 | 2441 |
|   | 0 |   |   | C3 | 1720 |
|   | - |   |   | D3 | 1077 |
| 5 | 0 | 2 | 3 | C2 | 2500 |
|   | 0 |   |   | C3 | 1803 |
|   | - |   |   | D3 | 1118 |
| 6 | 0 | 8 | 9 | A1 | 4689 |
|   | 0 |   |   | A2 | 4118 |
|   | 0 |   |   | A3 | 3736 |
|   | 0 |   |   | B1 | 3970 |
|   | 0 |   |   | B2 | 3280 |
|   | 0 |   |   | B3 | 2786 |
|   | 0 |   |   | C2 | 2561 |
|   | 0 |   |   | C3 | 1887 |
|   | - |   |   | D3 | 1166 |
| 7 | 0 | 7 | 8 | A2 | 4206 |
|   | 0 |   |   | A3 | 3833 |
|   | 0 |   |   | B1 | 4036 |
|   | 0 |   |   | B2 | 3360 |
|   | 0 |   |   | B3 | 2879 |
|   | 0 |   |   | C2 | 2625 |
|   | 0 |   |   | C3 | 1972 |
|   | - |   |   | D3 | 1221 |

F I G. 1 1 A

| PAD NUMBER | CONDITION | NUMBER OF EFFECTIVE ITEM | NUMBER OF CANDIDATES | BALL NUMBER | RELATIVE DISTANCE ($\Delta p$) |
|---|---|---|---|---|---|
| 8 | 0 | 7 | 8 | A2 | 4294 |
|   | 0 |   |   | A3 | 3929 |
|   | 0 |   |   | B1 | 4104 |
|   | 0 |   |   | B2 | 3441 |
|   | 0 |   |   | B3 | 2973 |
|   | 0 |   |   | C2 | 2691 |
|   | 0 |   |   | C3 | 2059 |
|   | - |   |   | D3 | 1281 |
| 9 | 0 | 1 | 2 | C3 | 2147 |
|   | - |   |   | D3 | 1345 |

F I G. 1 1 B

| PAD NUMBER | CONDITION | NUMBER OF EFFECTIVE ITEM | NUMBER OF CANDIDATES | BALL NUMBER | RELATIVE DISTANCE (Δp) |
|---|---|---|---|---|---|
| 1 | 0 | 2 | 4 | B3 | 2326 |
|  | 0 |  |  | C2 | 2283 |
|  | − |  |  | C3 | 1487 |
|  | − |  |  | D3 | 1005 |
| 2 | 0 | 3 | 5 | B2 | 2973 |
|  | 0 |  |  | B3 | 2417 |
|  | 0 |  |  | C2 | 2332 |
|  | − |  |  | C3 | 1562 |
|  | − |  |  | D3 | 1020 |
| 3 | 1 | 0 | 1 | D3 | 1044 |
| 4 | 0 | 7 | 9 | A1 | 4534 |
|  | 0 |  |  | A2 | 3945 |
|  | 0 |  |  | A3 | 3544 |
|  | 0 |  |  | B1 | 3842 |
|  | 0 |  |  | B2 | 3124 |
|  | 0 |  |  | B3 | 2600 |
|  | 0 |  |  | C2 | 2441 |
|  | − |  |  | C3 | 1720 |
|  | − |  |  | D3 | 1077 |
| 5 | 0 | 1 | 3 | C2 | 2500 |
|  | − |  |  | C3 | 1803 |
|  | − |  |  | D3 | 1118 |
| 6 | 0 | 7 | 9 | A1 | 4689 |
|  | 0 |  |  | A2 | 4118 |
|  | 0 |  |  | A3 | 3736 |
|  | 0 |  |  | B1 | 3970 |
|  | 0 |  |  | B2 | 3280 |
|  | 0 |  |  | B3 | 2786 |
|  | 0 |  |  | C2 | 2561 |
|  | − |  |  | C3 | 1887 |
|  | − |  |  | D3 | 1166 |
| 7 | 0 | 6 | 8 | A2 | 4206 |
|  | 0 |  |  | A3 | 3833 |
|  | 0 |  |  | B1 | 4036 |
|  | 0 |  |  | B2 | 3360 |
|  | 0 |  |  | B3 | 2879 |
|  | 0 |  |  | C2 | 2625 |
|  | − |  |  | C3 | 1972 |
|  | − |  |  | D3 | 1221 |

F I G. 1 2 A

| PAD NUMBER | CONDITION | NUMBER OF EFFECTIVE ITEM | NUMBER OF CANDIDATES | BALL NUMBER | RELATIVE DISTANCE (Δp) |
|---|---|---|---|---|---|
| 8 | 0 | 6 | 8 | A2 | 4294 |
|   | 0 |   |   | A3 | 3929 |
|   | 0 |   |   | B1 | 4104 |
|   | 0 |   |   | B2 | 3441 |
|   | 0 |   |   | B3 | 2973 |
|   | 0 |   |   | C2 | 2691 |
|   | − |   |   | C3 | 2059 |
|   | − |   |   | D3 | 1281 |
| 9 | 1 | 0 | 2 | C3 | 2147 |
|   | − |   |   | D3 | 1345 |

F I G. 1 2 B

| PAD NUMBER | CONDITION | NUMBER OF EFFECTIVE ITEM | NUMBER OF CANDIDATES | BALL NUMBER | RELATIVE DISTANCE ($\Delta p$) |
|---|---|---|---|---|---|
| 1 | 1 | 0 | 4 | B3 | 2326 |
|   | - |   |   | C2 | 2283 |
|   | - |   |   | C3 | 1487 |
|   | - |   |   | D3 | 1005 |
| 2 | 1 | 0 | 5 | B2 | 2973 |
|   | - |   |   | B3 | 2417 |
|   | - |   |   | C2 | 2332 |
|   | - |   |   | C3 | 1562 |
|   | - |   |   | D3 | 1020 |
| 3 | 1 | 0 | 1 | D3 | 1044 |
| 4 | 0 | 4 | 9 | A1 | 4534 |
|   | 0 |   |   | A2 | 3945 |
|   | 0 |   |   | A3 | 3544 |
|   | 0 |   |   | B1 | 3842 |
|   | - |   |   | B2 | 3124 |
|   | - |   |   | B3 | 2600 |
|   | - |   |   | C2 | 2441 |
|   | - |   |   | C3 | 1720 |
|   | - |   |   | D3 | 1077 |
| 5 | 1 | 0 | 3 | C2 | 2500 |
|   | - |   |   | C3 | 1803 |
|   | - |   |   | D3 | 1118 |
| 6 | 0 | 4 | 9 | A1 | 4689 |
|   | 0 |   |   | A2 | 4118 |
|   | 0 |   |   | A3 | 3736 |
|   | 0 |   |   | B1 | 3970 |
|   | - |   |   | B2 | 3280 |
|   | - |   |   | B3 | 2786 |
|   | - |   |   | C2 | 2561 |
|   | - |   |   | C3 | 1887 |
|   | - |   |   | D3 | 1166 |
| 7 | 0 | 3 | 8 | A2 | 4206 |
|   | 0 |   |   | A3 | 3833 |
|   | 0 |   |   | B1 | 4036 |
|   | - |   |   | B2 | 3360 |
|   | - |   |   | B3 | 2879 |
|   | - |   |   | C2 | 2625 |
|   | - |   |   | C3 | 1972 |
|   | - |   |   | D3 | 1221 |

F I G. 1 3 A

| PAD NUMBER | CONDITION | NUMBER OF EFFECTIVE ITEM | NUMBER OF CANDIDATES | BALL NUMBER | RELATIVE DISTANCE ($\Delta p$) |
|---|---|---|---|---|---|
| 8 | 0 | 3 | 8 | A2 | 4294 |
|  | 0 |  |  | A3 | 3929 |
|  | 0 |  |  | B1 | 4104 |
|  | - |  |  | B2 | 3441 |
|  | - |  |  | B3 | 2973 |
|  | - |  |  | C2 | 2691 |
|  | - |  |  | C3 | 2059 |
|  | - |  |  | D3 | 1281 |
| 9 | 1 | 0 | 2 | C3 | 2147 |
|  | - |  |  | D3 | 1345 |

F I G. 1 3 B

| ARRANGEMENT PRIORITY | PAD NUMBER | MAXIMUM ALLOWABLE DISTANCE (Δr) | BALL NUMBER, RELATIVE DISTANCE (ΔP) | | | | | | | | |
|---|---|---|---|---|---|---|---|---|---|---|---|
| | | | D3 | C3 | C2 | B3 | B2 | A3 | B1 | A2 | A1 |
| 1 | 3 | 1176 | 1044 | | | | | | | | |
| 2 | 9 | 2750 | 1345 | 2147 | | | | | | | |
| 3 | 5 | 2588 | 1118 | 1803 | 2500 | | | | | | |
| 4 | 1 | 2500 | 1005 | 1487 | 2283 | 2326 | | | | | |
| 5 | 2 | 3235 | 1020 | 1562 | 2332 | 2417 | 2973 | | | | |
| 6 | 8 | 4745 | 1281 | 2059 | 2691 | 2973 | 3441 | 3929 | 4104 | 4294 | |
| 7 | 7 | 4745 | 1221 | 1972 | 2625 | 2879 | 3360 | 3833 | 4036 | 4206 | |
| 8 | 6 | 4745 | 1166 | 1887 | 2561 | 2786 | 3280 | 3736 | 3970 | 4118 | 4686 |
| 9 | 4 | 4745 | 1077 | 1720 | 2441 | 2600 | 3124 | 3544 | 3842 | 3945 | 4534 |

| ARRANGEMENT PRIORITY | PAD NUMBER | MAXIMUM ALLOWABLE DISTANCE (Δr) | BALL NUMBER, RELATIVE DISTANCE (ΔP) | | | | | | | | |
|---|---|---|---|---|---|---|---|---|---|---|---|
| | | | D3 | C3 | C2 | B3 | B2 | A3 | B1 | A2 | A1 |
| 1 | 3 | 1766 | 1044 | | | | | | | | |
| 2 | 1 | 2500 | 1005 | 1487 | 2283 | | | | | | |
| 3 | 5 | 2588 | 1118 | 1803 | 2500 | | | | | | |
| 4 | 9 | 2750 | 1345 | 2147 | | (NOT AVAILABLE FOR ASSIGNMENT) | | | | | |
| 5 | 2 | 3235 | 1020 | 1562 | 2332 | 2417 | 2973 | | | | |
| 6 | 8 | — | 1077 | 1720 | 2441 | 2600 | 3124 | 3544 | 3842 | 3945 | 4534 |
| 7 | 7 | — | 1166 | 1887 | 2561 | 2789 | 3280 | 3736 | 3970 | 4118 | 4686 |
| 8 | 6 | — | 1221 | 1972 | 2625 | 2879 | 3360 | 3833 | 4036 | 4206 | 4763 |
| 9 | 4 | — | 1281 | 2059 | 2691 | 2973 | 3441 | 4104 | 3929 | 4294 | 4841 |

US 8,843,868 B2

METHOD FOR ASSIGNING TERMINAL OF SEMICONDUCTOR PACKAGE, APPARATUS, AND SEMICONDUCTOR PACKAGE

CROSS-REFERENCE TO RELATED APPLICATIONS

This application is a continuation application of International Application PCT/JP2010/006596, filed on Nov. 10, 2010, and designated the U.S., the entire contents of which are incorporated herein by reference.

FIELD

The present invention relates to a method for assigning each of a plurality of terminals of a package substrate that is jointed to semiconductor chips, to each of a plurality of pads of the semiconductor pads; a program to execute the decision method; an apparatus for supporting the assignment of the terminals of the semiconductor package, and a semiconductor package.

BACKGROUND

A semiconductor chip including a semiconductor device and the like is jointed to a package substrate and mounted on a printed wiring board and the like as a semiconductor package.

For Example, in a semiconductor package, a plurality of pads of the semiconductor chip and a plurality of terminals provided on prescribed positions on the package substrate are electrically connected by bonding wires, and electrically connected through wiring provided on the package substrate. Meanwhile, the terminal refers to a terminal that is provided on the joint surface of the package substrate to which the semiconductor chip is jointed, and that is connected through a via and the like via a bump (ball), a land or a pin of the package substrate used when the package substrate is jointed to the printed wiring board. Since the bump (ball), the land or the pin is provided on prescribed positions of the package substrate, the terminals mentioned above are also provided on prescribed positions on the package substrate in the same manner with the bump (ball), the land or the pin.

Such assignment for wiring of a plurality of pads of a semiconductor chip and a plurality of terminals provided on prescribed positions of a package substrate, that is, the assignment of the terminals to the pads is performed according to the design policy of the semiconductor manufacturer. Since there are a large number of combinations for the assignment according to the number of pads and the number of terminal, when the design policy is different, the assignment result is also different.

For example, a design method of a semiconductor chip has been known that optimizes the connection between input/output pads that are flip-chip jointed to a semiconductor package and the land for the bump.

In the design method, specifically, in descending order from the high rank of importance of the electrical characteristic, a pin of the package in the shortest distance from each of the input/output pads included in the rank is selected respectively. Then, according to the electrical characteristic of the wiring pattern at the semiconductor chip side and the electrical characteristic of the wiring pattern at the package side, the optimal land for the bump is arranged and selected respectively on the straight line or its vicinity that passes through each of the input/output pads and the selected pin of the package. Accordingly, a wiring pattern in which the land for the bump arranged and selected for each of the input/output pads and the input/output pads are respectively connected is designed.

Incidentally, in recent years, the integration degree of the semiconductor chip has been more and more integrated, and as the function of the semiconductor chip improves, on the pad of the semiconductor chip pad, in the assignment mentioned above, the number of pads with a high degree of importance of the electrical characteristic, that is, the number of important pads has been increasing. Now, for example, a case in which about 10% of the number of pads of a semiconductor chip are important pads for which the assignment mentioned above is performed in consideration of their electrical characteristic is assumed. For example, when the number of pads is 1000, the number of important pads is about 100. Here, the important pads whose degree of importance of electrical characteristics is high are, for example, the pad that inputs/outputs a signal with a smaller amplitude compared to the power supply voltage or a analog signal, the pad that supplies power supply voltage, the pad connected to the ground, and the like.

When the number of such important pads with high degree of importance of the electrical characteristic is increasing, in order to satisfy the constraint condition of the electrical characteristic, the terminals of the package substrate are often assigned to the vicinity of the pads of the semiconductor chip. In the known design method of the semiconductor chip mentioned above, since the assignment is performed in descending order from the pad of the high rank of importance of electrical characteristic, the terminals of the package substrate is assigned to the vicinity of the semiconductor chip in a concentrated manner.

However, when the terminals of the package substrate are assigned in a concentrated manner to the vicinity of the pads of the semiconductor chip in consideration of important pads, for other pads with easier constraint condition of the electrical characteristics and low priority for assignment, assignment that satisfies the constraint condition may not be able to be performed. In such a case, for example, a redesign of the package substrate is to be performed manually by means such as to change the interval of terminals of the package substrate that are the target of the assignment, making it impossible to assign the terminals of the semiconductor package efficiently.

RELATED ART DOCUMENT

Patent Documents

[Patent Document 1] Japanese Laid-open Patent Publication No. 2002-289636

SUMMARY

According to an aspect of the embodiments, an assignment method of terminals of a semiconductor package executed by an assignment supporting apparatus that assigns, to each of a plurality of pads of a semiconductor chip, one of a plurality of terminals provided at prescribed positions of a package substrate to which the semiconductor chip is jointed, the method includes: deciding a maximum allowable distance to be a constraint condition regarding a relative distance between each of the pads and a terminal to be assigned to the pad by using a data processing unit of the assignment supporting apparatus, and extracting one or a plurality of assigned terminal candidates for each of the pads so that the relative distance between each of the pads and a terminal selected for the pad falls within a range of the maximum allowable distance by using the data processing unit; and performing a process to decide one of the terminals as a assigned terminal based on the assigned terminal candidates and assign the one of the terminals to one of the pads by using the data processing unit; wherein the process is a process to assign one of the terminals with priority to a pad having a smallest number of assigned terminal candidates in a not-assigned condition based on the assigned terminal candidates.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of coordinate data of the arrangement position of the pad in the present embodiment;

FIG. 7 is a diagram illustrating an example of coordinate data of the arrangement position of the ball in the present embodiment;

FIG. 8 is a diagram illustrating an example of information of the electrical characteristic of each pad in the present embodiment;

FIG. 9 is a diagram illustrating an example of the value of the inductance characteristic distance, the capacitance characteristic distance, and the resistance characteristic distance, and the maximum allowable distance;

FIG. 10A and FIG. 10B are a diagram illustrating an example of a ball information list obtained from the example illustrated in FIG. 5;

FIG. 11A and FIG. 11B are a diagram illustrating an example of the result processed in the ball information list illustrated in FIG. 10;

FIG. 12A and FIG. 12B are a diagram illustrating an example of the result processed in the ball information list illustrated in FIG. 11;

FIG. 13A and FIG. 13B are a diagram illustrating an example of the result processed in the ball information list illustrated in FIG. 12;

FIG. 14 is a diagram illustrating an example of the result of assignment obtained from the ball information list illustrated in FIG. 10;

FIG. 15 is a diagram illustrating the result of a case of assigning the ball according to the conventional method.

DESCRIPTION OF EMBODIMENTS

Herein after, a method for assigning terminals of a package substrate, a program to execute the decision method, an apparatus for supporting the assignment of the terminals of the semiconductor package, and a semiconductor package of the present invention are described in detail.

(A Semiconductor Package)

Figure 1A:
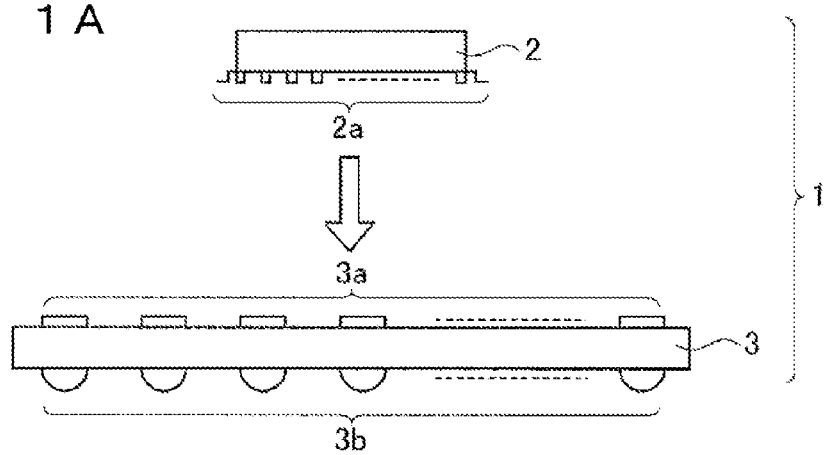
FIG. 1A is a schematic diagram of a semiconductor package of the present embodiment.

FIG. 1A illustrates a schematic diagram of a semiconductor package of the present embodiment.

The semiconductor package 1 of the present embodiment has a ball (bump) 3b of a ball grid array, and a semiconductor chip 2 is flip-flop jointed to a package substrate 3.

The semiconductor chip 2 includes a semiconductor device such as a microprocessor and the like. On the joint side of the semiconductor chip 2, a plurality of protruding pads 2a are formed, and each of the pads 2a is connected to a land (not illustrated in the drawing) formed on the joint surface of the package substrate 3. Each land is connected to each of the terminals 3a provided on the package substrate 3 by wiring (not illustrated in the drawing) provided on the package substrate. The terminal 3a is connected to the ball 3b on the opposite surface via a via (not illustrated in the drawing).

In the embodiment, while the pad 2a of the semiconductor chip 2 is electrically connected to the terminal 3a of the package substrate 3 via wiring by flip-chip joint, the pad 2a and the terminal 3a may be connected electrically by wire bonding. In addition, while the semiconductor package 1 is mounted on the printed wiring board by the ball grid array, a land grid array and a pin grid array may be used instead of the ball grid array.

Meanwhile, in the present embodiment, the ball 3b is explained as the terminal of the assignment target to each of the pads 2a.

The position of the terminal 3a connected to the pad 2a via wiring provided on the joint surface of the package substrate 3 is on the approximately same prescribed position of the ball 3b of the ball grid array across the package substrate 3. Accordingly, the relative distance between the pad 2a and the ball 3b described later is approximately the same as the relative distance between the pad 2a and the terminal 3a. Therefore, the distance between the pad 2a and the ball 3b may be substituted for the relative distance between the pad 2a and the terminal 3a. In the description below, the relative distance between the pad 2a and the ball 3b is used as the relative distance between the pad 2a and the terminal 3a.

In the embodiment, while the ball 3b is the terminal of the assignment target to each of the pads 2a, the terminal 3a provided on the joint surface of the package substrate 3 may also be the terminal of the assignment target.

Figure 1B:
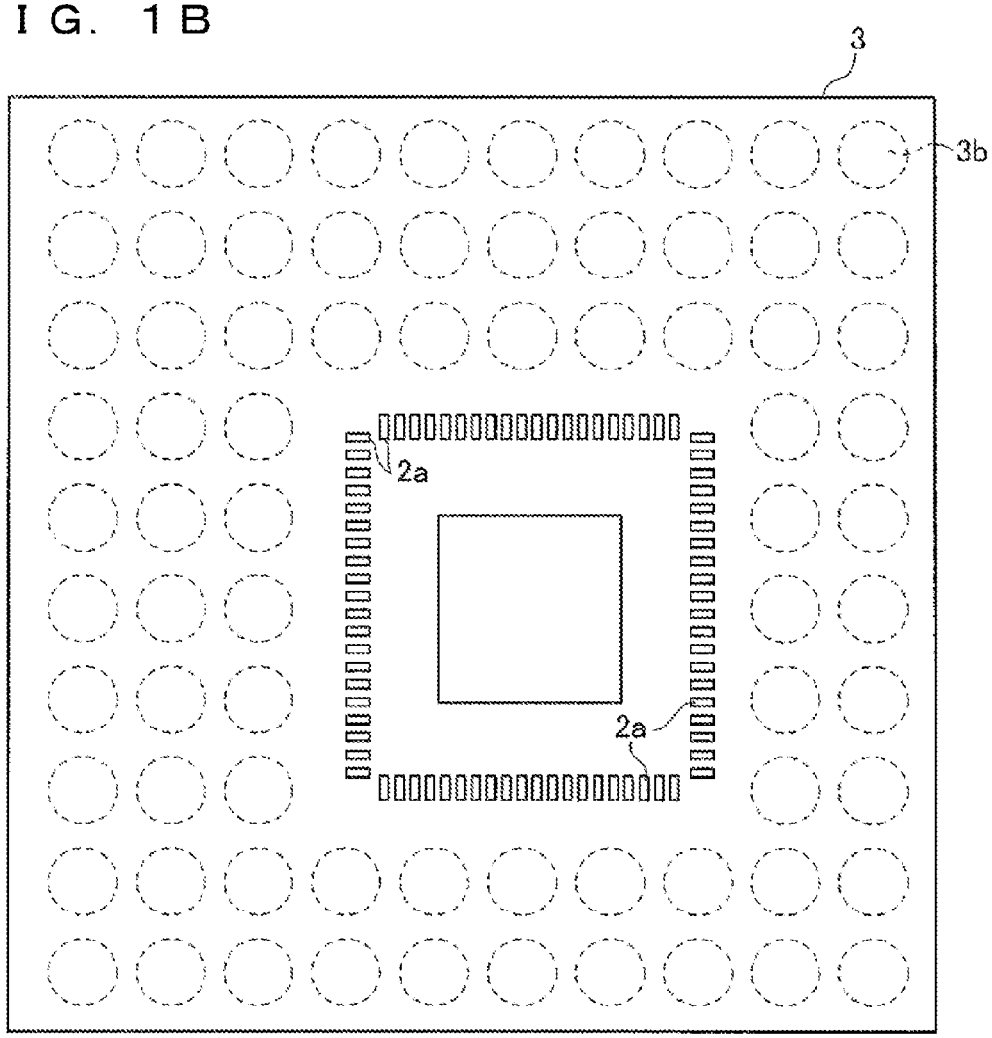
FIG. 1B is a diagram illustrating the joint position of the semiconductor chip, the arrangement position of the pad, and the arrangement position of the ball.

FIG. 1B illustrates the joint position of the semiconductor chip 2 (the approximate square shape area), the arrangement position of the pad 2a (the think micro rectangular shape area), and the arrangement position of the ball 3b (the area of the ○ mark) when the semiconductor chip 2 is mounted on the package substrate 3 and jointed to it.

The pads 2a are provided in a line at certain intervals along each side in four directions of the semiconductor chip 2. Each of the pads 2a extends in a protruding manner toward the outer side of the semiconductor chip 2. The balls 3b are provided in the vertical direction and the horizontal direction at a certain intervals in such a manner as enclosing the pad 2a of the semiconductor chip 2. The internal between the adjacent pads 2a is smaller than the internal between the adjacent balls 3b.

In the embodiment, one of the balls 3b is assigned to each of the pad 2a according to the method described below.

(An Apparatus for Supporting the Assignment of the Terminals of the Semiconductor Package)

Figure 2:
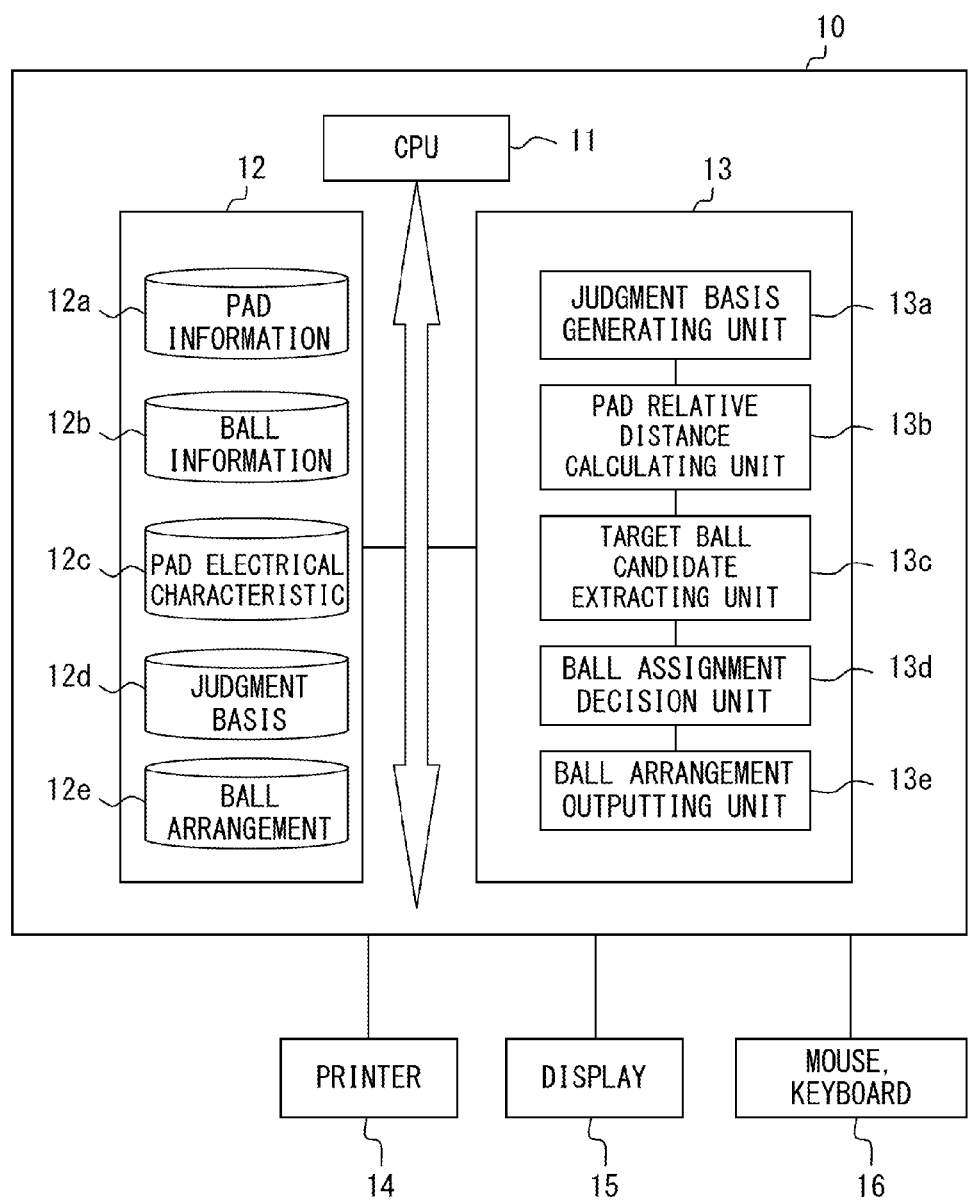
FIG. 2 is a schematic configuration diagram of an apparatus for supporting the assignment of the terminals of the semiconductor package.

FIG. 2 is a schematic configuration diagram of an apparatus 10 for supporting the assignment of the terminals of the semiconductor package (hereinafter, referred to as a supporting apparatus) according to the embodiment.

The supporting apparatus 10 is an apparatus that decides the wiring by assigning each of the balls 3b of the package substrate 3 to each of the pads 2a of the semiconductor chip 2, and is a computer to which a printer 14, display 15, and a mouse/keyboard 16 are connected. The computer decides the wiring by assigning each of the balls 3b of the package substrate 3 to each of the pads 2a of the semiconductor chip 2 jointed to the package substrate 3 by executing a program described later.

Specifically, the supporting apparatus 10 includes a CPU 11, a storage unit 12 and a data processing unit 13.

The storage unit 12 includes a pad information storage unit 12a, a ball information storage unit 12b, a pad electrical characteristic storage unit 12c, a judgment basis storage unit 12d, and a ball arrangement information storage unit 12e.

The pad information storage unit 12a stores data of the arrangement position of each of the pads 2a. The ball information storage unit 12b stores data of the arrangement position of each of the balls 3b. The arrangement position of the pad 2a and the ball 3b is expressed by the coordinates with the center position of the semiconductor chip 2 jointed to the package substrate 3 as the origin.

The pad electrical characteristic storage unit 12c divides the electrical characteristic of each of pad 2a into the inductance component (L), the capacitance component (C) and the resistance component (R), and stores their values. Of course, in the pads 2a, only a pad whose electrical characteristic is subject to a condition has the information of the electrical characteristic, and a pad whose electrical characteristic is not subject to a condition does not have the information of the electrical characteristic.

The judgment basis storage unit 12d stores the geometric basis distance. The geometric basis distance is a judgment basis distance determined from the arrangement of the pad 2a and the arrangement of the ball 3b. The geometric basis distance is used for pads that are not subject to a condition by the information of the electrical characteristic. That is, the geometric basis distance is used as a geometric constraint condition when an assigned ball candidate to be the assignment target is extracted, as described later. As the geometric basis distance, the distance calculated from information of the arrangement position of the pad 2a and the ball 3b may be used, or the distance used at previous assignment may be stored as the geometric basis distance and may be used.

The ball arrangement information storage unit 12e stores information of the pair of the pad 2a and ball 3b the assignment of which is determined.

The data processing unit 13 is a processing unit formed by executing a program, and includes a judgment basis generating unit 13a, a pad relative distance calculating unit 13b, a target ball candidate extracting unit 13c, a ball assignment deciding unit 13d, and a ball arrangement outputting unit 13e. The processing operations performed in each of these parts are practically performed by the CPU 11.

The judgment basis generating unit 13a decides the geometric basis distance and the electrical characteristic distance which is allowable for the electrical characteristic of the pad, and decides the maximum allowable distance between each of the pad 2a and the ball 3b to be assigned to each of the pads 2a based on the geometric basis distance and the electrical characteristic distance.

The pad relative distance calculating unit 13b calculates the relative distance (separation distance) $\Delta p$ between each of the pads 2a and the ball 3b selected for each of the pads 2a. The relative distance $\Delta p$ is defined as the normally used distance, that is, ((X coordinate of the pad−X coordinate of the ball)2+(Y coordinate of the pad−Y coordinate of the ball)2)(½). Meanwhile, the unit of all the values of the distance specifically described herein is μm.

The target ball candidate extracting unit 13c extracts one or a plurality of assigned ball candidate for each of pads 2a so that the relative distance $\Delta p$ calculated by the pad relative distance calculating unit 13b is within the range of the maximum allowable distance decided by the judgment basis generating unit 13a.

The ball assignment deciding unit 13d repeats the process of deciding one of the balls 3b as the assigned ball based on the assigned ball candidate and assigning it to one of the pads 3b. At this time, in the process, in the assigned ball candidates, one of the ball 3b is assigned with priority to the pad with the smallest number of candidates in the not-assigned condition. Accordingly, the ball assignment deciding unit 13d decides the wiring between the pad 2a and the ball 3b.

The ball arrangement outputting unit 13e makes the information of the pair of the pad 2a and the ball 3b assigned to each of the pads 2a stored in the ball arrangement information storage unit 12e, or causes the printer 14 or the display 15 to output the information.

The function of each part of the data processing unit 13 is described detail in the method for assigning the terminals of the semiconductor package below.

(A Method for Assigning the Terminals of the Semiconductor Package)

Figure 3:
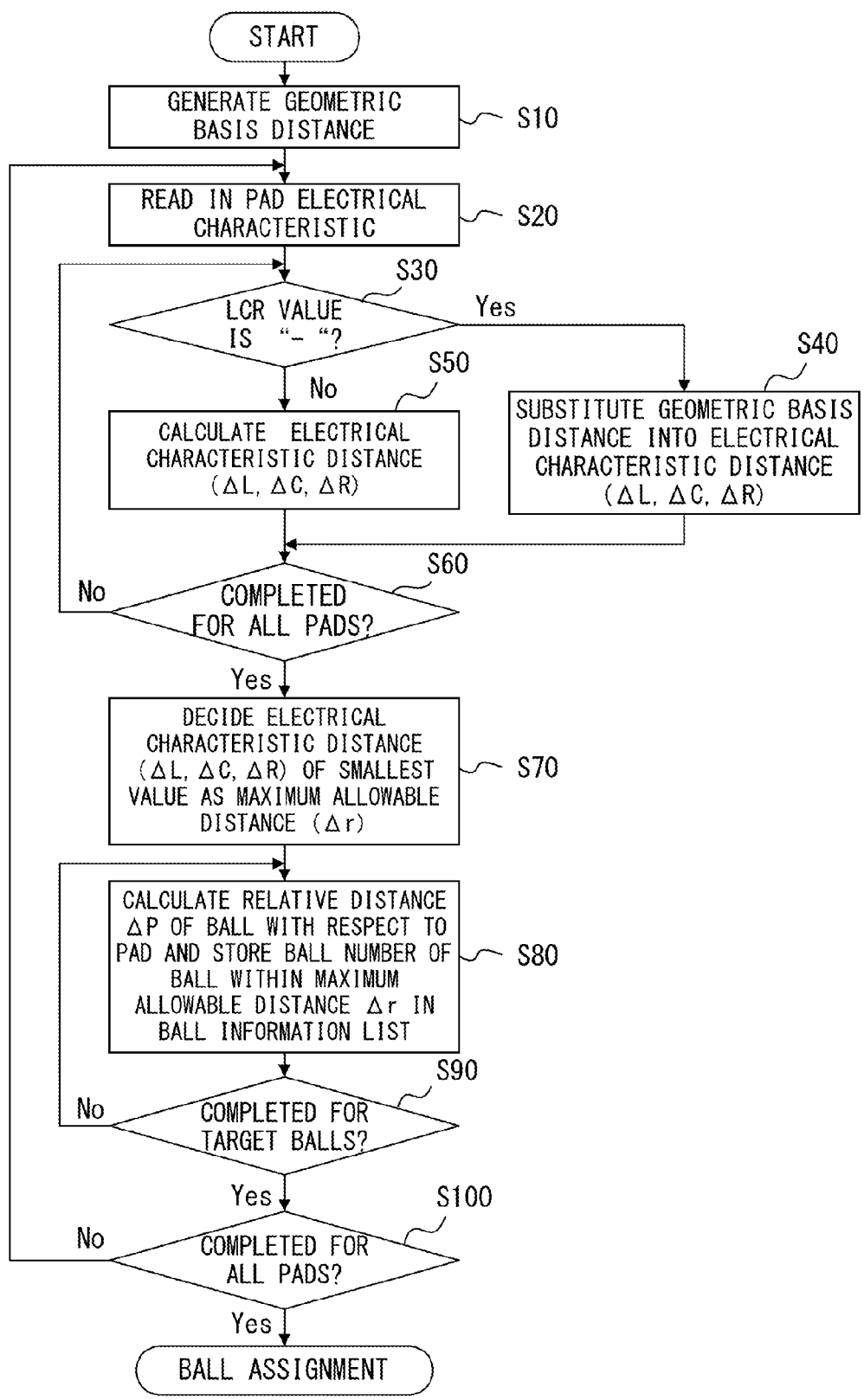
FIG. 3 is the first half of the flowchart of the method for assigning the terminals of the semiconductor package.
Figure 4:
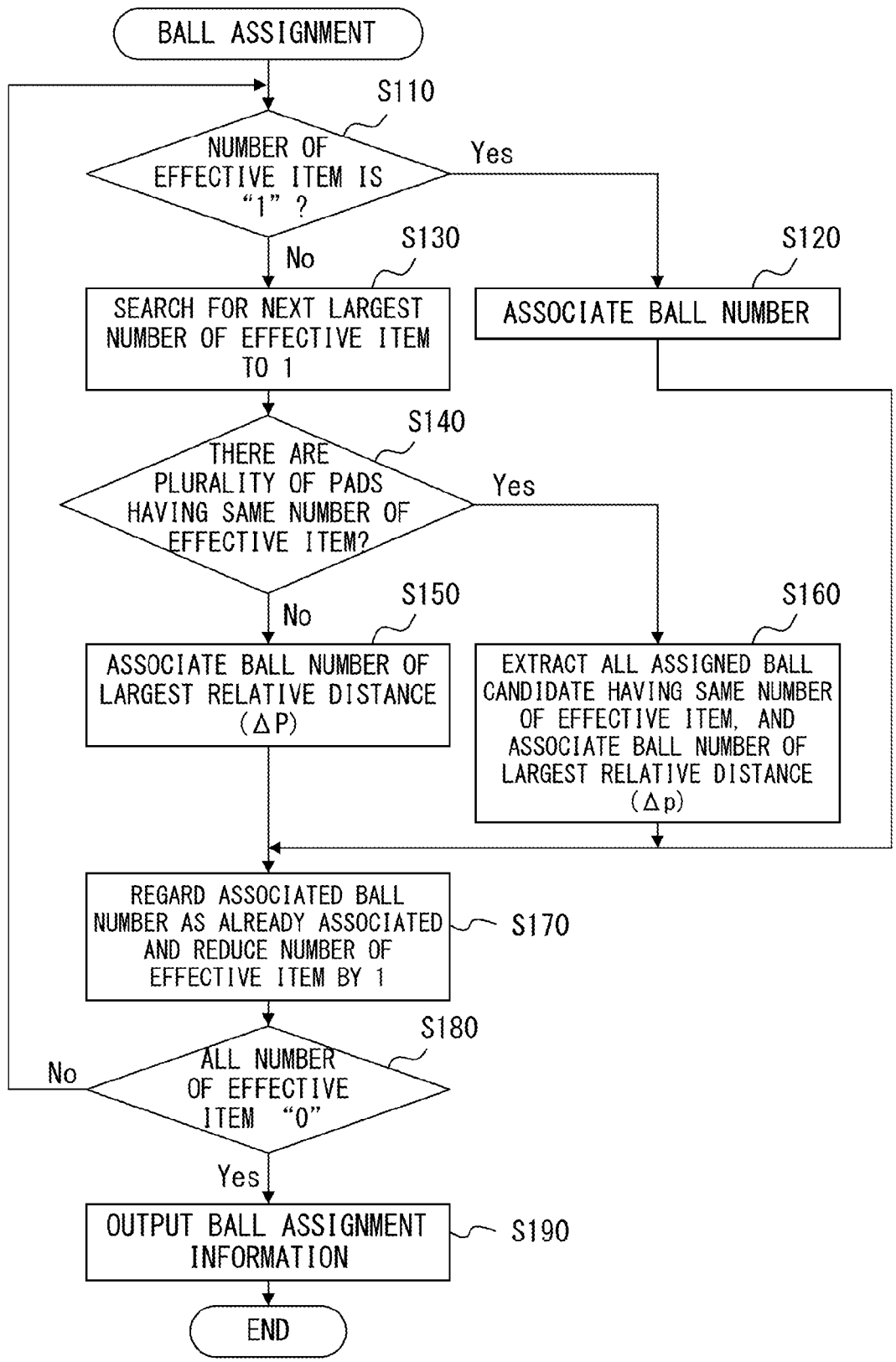
FIG. 4 is the second half of the flowchart of the method for assigning the terminals of the semiconductor package.
Figure 5:
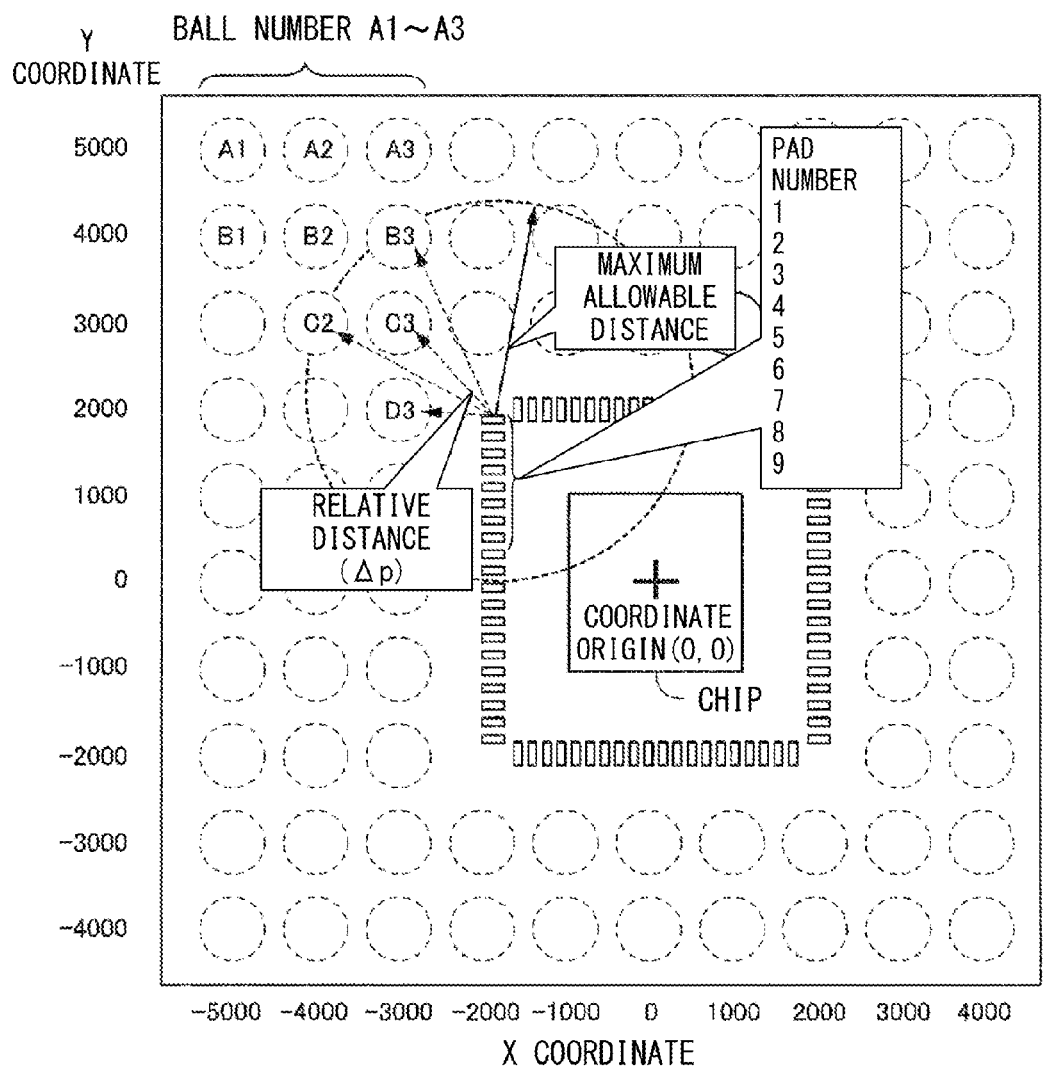
FIG. 5 is a diagram explaining the assignment of the pad and the ball in the present embodiment.

FIG. 3 and FIG. 4 are flowcharts of the method for assigning the terminals of the semiconductor package of the present embodiment, and FIG. 5 illustrates the assignment of the pad and the ball.

First, the judgment basis generating unit 13a generates the geometric basis distance (step S10). The geometric basis distance is generated to extract an assigned ball candidate by setting a geometric constraint condition for a pad that is not subject to a constraint by information of the electrical characteristic. For example, a case in which, in the pads 2a illustrated in FIG. 5, the 9 pads 2a (pads of pad number 1-9) located on the upper portion of the left of the drawing are assigned to the 9 balls 3b (9 balls indicated as ball numbers A1-D3) located on the upper portion of the left of the drawing is assumed. In this case, as illustrated in FIG. 5, when the positions of the pads 2a and the balls 3b in the X-Y coordinate series with the center position of the semiconductor chip 2 as the coordinate origin, in the pads 2a and the balls 3b included in the same quadrant of the X-Y coordinate, the pad and the ball that are furthest from the coordinate origin is obtained, and the distance between the pad and the ball is obtained, and the value obtained by multiplying the distance by a certain multiplying factor is calculated as the geometric basis distance. The judgment basis generating unit 13a may retrieve the coordinate data of the arrangement position of the pads 2a and the balls 3b from the pad information storage unit 12a and the ball information storage unit 12b, respectively, and obtain the distance between the pad 2a and the ball 3b that are furthest from the coordinate origin. In addition, the certain multiplying factor is expressed as, for example, 1+α (α is a constant number), and for α, for example, (interval between pads 2a)/(interval between balls 3b) is used. When the interval between balls 3b is small, it means that the number of balls 3b is large and concentrated, and to make it possible to extract many assigned ball candidates, α becomes large. In the present embodiment, a certain multiplying factor is used in the form of 1+α, but the certain multiplying factor may be set using a method other than this, for example, by using a value of α that is empirically found. Meanwhile, while the judgment basis generating unit 13a generates the geometric basis distance by calculating the distance between the pad 2a and the ball 3b that are furthest from the coordinate origin, this is not a limitation. For example, the judgment basis generating unit 13a may use the geometric basis distance that was used when the assignment process was performed previously. Furthermore, the judgment basis generating unit 13a may also use a distance that the operator input from the mouse/keyboard 16 as the geometric basis distance.

FIG. 6 and FIG. 7 illustrate an example of coordinate data of the arrangement positions of the respective pads 2a and the balls 3b. Coordinate data as illustrated in FIG. 6 and FIG. 7 are stored in the pad information storage unit 12a and the ball information storage unit 12b. Here, as illustrated in FIG. 5, the pad number of each of the 9 balls 3b is defined as 1, 2, 3, ..., 9 in order from the pad located on the upper side of the drawing. Meanwhile, for the balls located on the line of the left top row in the drawing, A1, A2, A3 are set in the order of arrangement in the right direction, and for the balls located on the line of the second row, B1, B2, B3 are set in the order of arrangement in the right direction, and further, for the balls located on the line of the third row, C2, C3 are set in the order of arrangement in the right direction, and further, for the ball located on the line of the fourth row, D3 set in the order of arrangement in the right direction.

Next, the judgment basis generating unit 13a reads information of the electrical characteristic of each of the pads 2a (step S20). When the pad 2a has an electrical characteristic, the electrical characteristic is defined for each of the inductance component (L), capacitance component (C) and resistance component (R), and includes at least one component of the three components. The judgment basis generating unit 13a retrieves information of these components from the pad electrical characteristic storage unit 12c. FIG. 8 illustrates an example of information of the electrical characteristic of each of the pads 2a. The example illustrated in FIG. 8 represent that the pads 1 and 2 has constraints of the electrical characteristic of 2.5 (nH) and 3.00 (nH) about the inductance component, respectively, the pad 3 has a constraint of the electrical characteristic of 100 (mΩ) for the resistance component, the pad 5 has a constraint of the electrical characteristic of 220 (mΩ) for the resistance component, the pad 9 has a constraint of the electrical characteristics of 2.75 (nH) for the inductance component and 275 (mΩ) for the resistance component. Pad 4 and 6-8 have no constraint of the electrical characteristic. Such electrical characteristics are defined by the specification of the semiconductor chip 2, and the information may be obtained in advance.

Next, the judgment basis generating unit 13a checks the information of the electrical characteristic, and checks whether each of the pads 2a has the value of the inductance component (L), capacitance component (C), or the resistance component (R) one by one for each of the inductance component (L), capacitance component (C), and resistance component (R).

When the pad 2a does not have the value of the inductance component (L), capacitance component (C), or the resistance component (R) (in the case of "Yes" in step S30), that is, the pad is not subject to any of the electrical characteristic, the value of the geometric basis distance obtained earlier is substituted into the electrical characteristic distance (step S40). Accordingly, the value of electrical characteristic distance is given to all the pads 2a that are not subject to the constraint of the electrical characteristic.

On the other hand, when the pad 2a has the value of the inductance component (L), capacitance component (C), or the resistance component (R) (in the case of "No" in step S30), the electrical characteristic is calculated based on the information of the electrical characteristic (step S50). Specifically speaking, for example, when the value of the electrical characteristic of the inductance component (L) is L, the judgment basis generating unit 13a calculates the inductance characteristic distance ΔL of the inductance component (L) by dividing the L by the value Lb of the inductance component per the unit length of the wiring provided on the package substrate 2. In a similar manner, when the value of the electrical characteristic of the capacitance component (C) is C, the judgment basis generating unit 13a calculates the capacitance characteristic distance ΔC of the capacitance component (C) by dividing the C by the value Cb of the capacitance component per the unit length of the wiring provided on the package substrate 2. In a similar manner, when the value of the electrical characteristic of the resistance component (R) is R, the judgment basis generating unit 13a calculates the resistance characteristic distance ΔR of the resistance component (R) by dividing the R by the value Rb of the resistance component per the unit length of the wiring provided on the package substrate 2. These calculated values represent the allowable maximum distance for each component of the inductance component (L), capacitance component (C), and resistance component (R). The value Lb of the inductance component per unit length, the value Cb of the capacitance component per unit length, the value Rb of the resistance component per unit length may all be calculated from the material and the size shape of the wiring.

In the case of the information of the electrical characteristic illustrated in FIG. 8, the electrical characteristic distance of the inductance component (L) is obtained for the pads 1 and 2, the electrical characteristic distance of the resistance component (R) is obtained for the pads 3 and 5, and the electrical characteristic distance of the inductance component (L) and the electrical characteristic distance of the resistance component (R) are obtained for pads 9.

The judgment basis generating unit 13a judges whether or not the processes of the steps S30-S50 have been performed for all of the pads 2a and the value of the electrical characteristic distance has been obtained (step S60). When the value of the electrical characteristic distance has been obtained for all of the pads 2a, the judgment basis generating unit 13a sets the maximum allowable distance Δr for each of the pads 2a (step S70). Specifically, the judgment basis generating unit 13a sets the smallest value of the obtained electrical characteristic distances as the maximum allowable distance Δr for each of the pads 2a. Since the geometric basis distance is substituted into the electrical characteristic distance in step S40, the set maximum allowable distance Δr is the smallest distance in the geometric basis distance generated in step S10 and the electrical characteristic distance (inductance characteristic distance ΔL, capacitance characteristic distance ΔC, and resistance characteristic distance ΔR) calculated in step S50. As described later, the maximum allowable distance Δr is used as the constraint condition of the distance between each of the pads 2a and the ball 3b to be assigned to each of the pads 2a.

FIG. 9 illustrates an example of values of the inductance characteristic distance ΔL, capacitance characteristic distance ΔC, and resistance characteristic distance ΔR which are obtained from electrical characteristic of the pads 1-9, and the set maximum allowable distance Δr. According to FIG. 9, it is understood that the maximum allowable distance Δr is different between the pads 1-9. The judgment basis generating unit 13a makes the set maximum allowable distance Δr stored in the judgment basis storage unit 12d.

Next, the relative distance Δp of the ball with respect to the pad is calculated, and the number of the ball for which the relative distance Δp is within the maximum allowable distance Δr is input in the ball information list and stored as an assigned ball candidate for the pad (step S80). More specifically, the pad relative distance calculating unit 13b calculates the relative distance Δp between each of the pads 2a and each of the balls 3b. The pad relative distance calculating unit 13b retrieves the coordinate data of the arrangement position of each of the pads 2a and the balls 3b from the pad information storage unit 12a and the ball information storage unit 12b, and calculates the linear separation distance from the pad to the ball as the relative distance Δp.

In addition, the target ball candidate extracting unit 13c judges whether the calculated relative distance Δp falls within the maximum allowable distance Δr, and extracts a ball having relative distance Δp within the maximum allowable distance Δr as an assigned ball candidate, and inputs and stores the information of the ball number with respect to the pad number with the relative distance Δp in the ball information list.

The target ball candidate extracting unit 13c judges whether or not the process of step S80 has been performed for all the balls 3b to be the assignment target (Step S90). Further, the target ball candidate extracting unit 13c judges whether or not the process of step S80 has been performed for all the pads 2 (step S100). Thus, the assigned ball candidate is extracted for all the pads.

FIG. 10 including FIG. 10A and FIG. 10B illustrates an example of the ball information list obtained in a case of assigning the balls A1-D3 to the pads 1-9 illustrated in FIG. 5. As illustrated in FIG. 9, to each of the pad numbers 1-9, the assigned ball candidate is indicated by the ball number, and the relative distance Δp is also indicated. In addition, the "condition", the "number of effective item", and the "number of candidate" are indicated in the ball information list. The "condition" and the "number of effective item" are used in the ball assignment process described later, and change according to the progress of the assignment process. The "number of effective item" represents, specifically, the number of candidates in the not-assigned condition among the assigned ball candidates. The "number of candidate" is the initial number of assigned ball candidates before the assignment process is performed. In the example illustrated in FIG. 10, the pad of the pad number 1 represents that four balls B3, C2, C3, and D3 have been extracted as assigned ball candidates, and the pad of the pad number 3 represents that only the ball D3 has been extracted as the assigned ball candidate.

Next, the ball assignment deciding unit 13d performs the assignment of balls. The assignment of balls is performed in accordance with the generated ball information list.

FIG. 4 illustrates the flow of the assignment process.

The ball assignment deciding unit 13d first refers to the ball information list as illustrated in FIG. 10, and checks whether or not there is a pad whose "number of effective item", that is, the number of assigned ball candidate is "1" (step S110). When a pad whose "number of effective item" is 1 is found (in the case of "Yes"), the ball assignment deciding unit 13d performs the assignment of the ball by associating the ball number of the assigned ball candidate described in the ball information, to the pad number (step S120). That is, one assigned ball candidate is determined as the assigned ball.

In the case of the ball information list illustrated in FIG. 10, the "number of effective item" of the pad number 3 is 1, and the assigned ball candidate at that time is the ball number D3. Therefore, the ball assigned deciding unit 13d assigns the ball D3 to the pad of the pad number 3 by associating the pad number 3 and the ball number D3.

On the other hand, when no pad whose "number of effective item" is found in the ball information list (in the case of "No" in step S110), the ball assignment deciding unit 13d further searches for a pad having the next largest "number of effective item" to 1, that is, a pad having the smallest number that is larger than 1 (step S130).

At this time, the ball assignment deciding unit 13d judges whether or not there are a plurality of pads having the same "number of effective item" (step S140). When a plurality of pads having the same "number of effective item" do not exist (in the case of "No" in step S140), there is one pad having the next largest "number of effective item" to 1. Therefore, the ball assignment deciding unit 13d takes out the ball number having the largest relative distance Δp with respect to the pad having the next largest "number of effective item" to 1, and assigns the ball number to the pad number of the pad mentioned above (step S150). Accordingly, to the pad having the next largest "number of effective item" to 1, one assigned ball candidate is assigned as the assigned ball. That is, the assigned ball candidate mentioned above is decided as the assigned ball.

Thus, in the assigned process, one of the balls 3b is assigned with priority to the pad having the smallest number of candidates in the condition in which the assigned ball candidate is not assigned, that is, the smallest "number of effective item".

Since the assigned ball candidates all satisfies the condition of the maximum allowable distance Δr, it is a candidate that satisfies the geometric basis distance and the electrical characteristic distance. Therefore, the ball assignment deciding unit 13d may assign any of the assigned ball candidates. However, when there are a plurality of assigned ball candidates for one pad as described above, by assigning the ball having the largest relative distance Δp, it becomes possible to keep the degree of freedom of ball assignment for the subsequent assigning process. That is, ball assignment deciding unit 13d selects an assigned ball candidate with a small margin of the relative distance Δp with respect to the maximum allowable distance Δr and decides the assigned ball. Therefore, when assigning balls for remaining pads subsequently, the margin of the relative distance Δp with respect to the maximum allowable distance Δr may be kept.

On the other hand, in step S140, when there are a plurality of pads having the same "number of effective item" (in the case of "Yes"), the ball assignment deciding unit 13d takes out an assigned ball candidate for each of the pads having the same "number of effective item", and associate the ball number and the pad number having the largest relative distance Δp (step S160). Accordingly, the assigned ball candidate having the largest relative distance Δp with respect to each of the pads having the same "number of effective item" is decided as the assigned ball.

Thus, when there are a plurality of pads having the same "number of effective item", any priority cannot be assigned to the order of the assignment process since the "number of effective item" is the same. For this reason, all the assigned ball candidate for each of the pads having the same "number of effective item" are taken out, and the pair of the ball number and the pad number having the largest relative distance Δp among these is extracted, and the pad number and the ball number in the extracted pair is associated. That is, the assigned ball candidate having the ball number associated with the pair of the ball number and the pad number that realize the largest relative distance Δp is assigned to the pad having the pad number associated with the pair, as the assigned ball. The assigned ball is the assigned ball candidate that realizes the largest relative distance Δp to the pad in order to keep the degree of freedom in ball assignment in the subsequent assignment process. That is, the ball assignment deciding unit 13d selects the assignment ball candidate with a small margin of the relative distance Δp with respect to the maximum allowable distance Δr and decides the assigned ball, therefore, when assigning balls for remaining pads subsequently, the margin of the relative distance Δp with respect to the maximum allowable distance Δr may be kept.

Next, the ball assigned deciding unit 13d reduces the "number of effective item" of all the pads having the associated ball number in the ball information list by 1, as associated ball numbers has been associated (step S170). Further, the ball assignment deciding unit 13d changes the field of "condition" of the number of the associated ball number in the pad number to which the ball number has been associated from "0" to "1", where "1" is an identifier that indicates that a ball number has been assigned to the pad number. In addition, the field of "condition" of the associated ball number in other pad numbers is changed from "0" to "-", where "-" is an identifier representing the assigned condition that the ball number has been associated with another pad number.

Thus, in the ball information list, the pair of the assigned ball candidate assigned as the assigned ball and the pad is excluded, and the assignment process is continued as described later.

FIG. 11 including FIG. 11A and FIG. 11B illustrates an example of the result of the assignment process in which the pad number 3 and the ball number D3 are associated in the ball information list illustrated in FIG. 10. As illustrated in FIG. 11, the "condition" is changed from "0" to "1" in the ball number D3 of the pad number 3, and the "number of effective item" is changed from "1" to "0". Furthermore, the "number of effective item" of the pad numbers 1, 2, and 4-9 other than the pad number 3 for which the ball number D3 is extracted as the assigned ball candidate is reduced by 1, and further, the "condition" field corresponding to the ball number D3 in these pad numbers is changed from "0" to "—".

Next, the ball assignment deciding unit 13d judges whether the "number of effective item" has become 0 in all the pad numbers in the ball information list (step S180).

When the "number of effective item" has not been 0 (in the case of "No" in step S180), the ball assignment deciding unit 13d returns to step S110 and continues the assignment process in steps S110-S170.

Thus, steps S110-S170 are repeated until the "number of effective item" becomes 0 in all the pad numbers.

Thus, when performing the assignment process, the ball assignment deciding unit 13d excludes the pair of the assignment ball candidate that has already been decided as the assigned ball in the previous assignment step and the pad in the ball information list, and for each of the remaining pads, decides the assigned ball from the assigned ball candidates counted in the "number of effective item".

FIG. 12 including FIG. 12A and FIG. 12B illustrates an example of the result after repeating steps S110-S170 again from the ball information list illustrated in FIG. 11. As illustrated in FIG. 12, it means that the ball number C3 for the pad number 9 has been associated, and the ball C3 has been decided as the assigned ball for the pad 9.

FIG. 13 including FIG. 13A and FIG. 13B illustrates an example of the process result after step S110-step S170 are repeated 5 times again from the ball information list illustrated in FIG. 12, and ball numbers B2, B3, C2, C3, and D3 were associated to the pad numbers 2, 1, 5, 9, and 3, respectively. In the case illustrated in FIG. 13, the next "number of effective item" which is larger than 1 is 3, and the pad number 7 and the pad number 8 has the same "number of effective item" 3. Therefore, when performing the assignment further, the ball assignment deciding unit 13d decides the one having the largest relative distance Δp from among the balls A2, A3, and B1 being the assigned ball candidates for the pad number 7 and the balls A2, A3, and B1 being the assigned ball candidates for the pad number 8. In this case, the ball number A2 having the largest relative distance Δp (relative distance Δp=4294) is associated with the pad number 8.

Lastly, the ball arrangement outputting unit 13e outputs the information of the assigned ball to the pad, that is, the information of association of the ball number to the pad number, with the information of the maximum allowable distance Δr and the relative distance Δp, to at least one of the ball arrangement information storage unit 12e, and the printer 14 and the display 15 (step S190).

In the method of the present embodiment, in the supporting apparatus 10, the wiring is decided using the result of assignment of the ball 3b of the package substrate 3 to the pad 2a of the semiconductor chip 2.

FIG. 14 illustrates an example of the assignment result obtained from the ball information list illustrated in FIG. 10. FIG. 14 illustrates the information of the ball number of the ball 3b assigned to the pad 2a, the maximum allowable distance Δr, the relative distance Δp, and the information of the assigned ball number. It is represented that the ball 3b is assigned to each of the pad 2a one by one. In the drawing, the pair of the pad number and the ball number in the area in which the value of the relative distance Δp is enclosed by the thick frame represents the assigned pair.

Meanwhile, FIG. 15 illustrates the conventional method, that is, the result of the case in which ball assignment is performed in ascending order of the maximum allowable distance Δr obtained from the condition of the electrical characteristic.

In this case, the ball within the maximum allowable distance Δr cannot be extracted in the pad number 9. That is, no ball can be assigned to the pad of the pad number 9. This indicates that, as described above, since the terminals of the package substrate are assigned in a concentrated manner to the vicinity of the pad of the semiconductor chip, the pad of the pad number 9 which is low priority is no longer available for ball assignment. In the present embodiment, as illustrated in FIG. 14, the problem of assignment unavailability does not occur.

Figure 16:
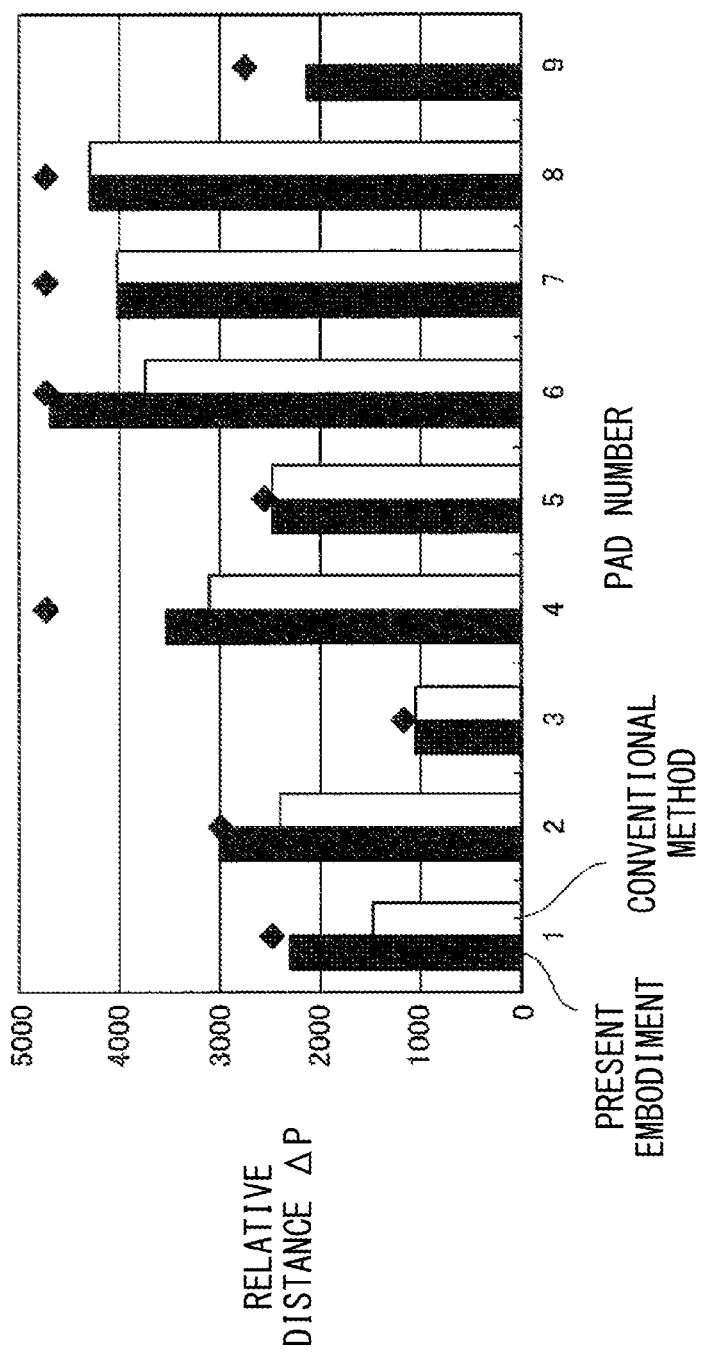
FIG. 16 is a diagram illustrating the relative distance of the pad and the assigned ball obtained by the present embodiment and by the conventional method.

FIG. 16 is a bar chart representing the relative distance Δp between the pad and the assigned ball for each pad number. The black bar represents the result of the present embodiment, and the white bar represents the result of the conventional method mentioned above. The black square in the chart represents the maximum allowable distance Δr. It is understood that, the relative distance Δp of the important pad for which the electrical characteristic distance is determined according to the condition of the electrical characteristic as illustrated in FIG. 9 is all close to the maximum allowable distance Δr and margin is small. This is, while satisfying the range of and not giving a large margin, the pads 4, 7, and 8 that are not subject to any condition by the electrical characteristic and the like are assigned to have a relatively large margin. This is a result of performing the assignment in order from the small number of assigned ball candidates and assigning the ball having the largest relative distance Δp at that time.

As described above, the present embodiment performs the assignment process with priority to the pad which has the smallest number of candidates in the not-assigned condition, making it possible to perform assignment to all the pad 2*a* effectively and without fail.

Since for the maximum allowable distance Δr, the smallest length of the distance is selected from among the geometric basis distance decided by the arrangement of the pad 2*a* and the arrangement of the ball 3*b* and the allowable electrical characteristic distance from the electrical characteristic of the pad 2, it is possible to extract the assigned ball candidate effectively in consideration of the condition of the electrical characteristic.

In addition, since the electrical characteristic distance includes at least one of the inductance characteristic distance ΔL, capacitance characteristic distance ΔC, and resistance component distance ΔR, the electrical characteristic may be converted into the distance appropriately.

Furthermore, in extracting the assigned ball candidate, when a group of plurality of assigned ball candidate is extracted, the terminal candidate having the largest relative distance Δp in each group of the extracted plurality of assigned ball candidates is decided as the assigned ball, therefore, the degree of freedom in ball assignment may be kept for the subsequent assignment process for other pads.

In extracting the assigned ball candidate, when a group of assignment terminal candidates having the same and smallest number of candidates is extracted for a plurality of pads, the pair of the remote pad and the remote terminal having the largest relative distance Δp with each of the group of the assigned ball candidate is extracted, and the remote terminal is decided as the assigned terminal for the remote pad. Therefore, the degree of freedom in ball assignment may be kept for the subsequent assignment process for other pads.

Furthermore, in deciding the assigned ball from the assigned ball candidates, the assigned ball candidate that has already been decided as the assigned ball is excluded, and the assigned ball is decided from the assigned ball candidate for each of the remaining pads. Therefore, the assignment process may be effectively and automatically.

The semiconductor package obtained by the present embodiment is done by being read and executed in the computer being the supporting apparatus 10.

That is, the program has a procedure of making the CPU 11 of the computer set the maximum allowable distance Δr for the relative distance between each of the pads 2*a* and the ball 3*b* to be assigned to each of the pads 2*a*; making the CPU 11 of the computer calculate one or a plurality of assigned ball candidate for each of the pad 2*a* so that the relative distance Δp between each of the pads 2*a* and the ball selected for each of the pads 2*a* falls within the range of the maximum allowable distance Δr; making the CPU 11 of the computer repeat the process of deciding one of the balls 3*b* based on the extracted assigned ball candidate as the assigned ball and assigning to one of the pads 2*a*; and making the printer 14 or the display 15 connected to the computer output the result of the process. At that time, the process is a process to assign one of the balls based on the assigned ball candidate with priority to the pad whose number of assigned ball candidates in the not-assigned condition is larger than one and smallest.

Such a program may be obtained by downloaded by the computer from a network, and other than that, may be obtained from a computer recording medium recording an executable program source.

In addition, the semiconductor package obtained by the present embodiment has a different form in terms of the assignment between the pad 2*a* and the ball 3*b* compared with the semiconductor package obtained by the conventional method.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. An assignment method of terminals of a semiconductor package executed by an assignment supporting apparatus that assigns, to each of a plurality of pads of a semiconductor chip, one of a plurality of terminals provided at prescribed positions of a package substrate to which the semiconductor chip is jointed, the method comprising:
    deciding a maximum allowable distance to be a constraint condition regarding a relative distance between each of the pads and a terminal to be assigned to the pad by using a data processing unit of the assignment supporting apparatus, and extracting one or a plurality of assigned terminal candidates for each of the pads so that the relative distance between each of the pads and a terminal selected for the pad falls within a range of the maximum allowable distance by using the data processing unit; and
    performing a process to decide one of the terminals as a assigned terminal based on the assigned terminal candidates and assign the one of the terminals to one of the pads by using the data processing unit; wherein
    the process is a process to assign one of the terminals with priority to a pad having a smallest number of assigned terminal candidates in a not-assigned condition based on the assigned terminal candidates.

2. The assignment method of terminals of a semiconductor package according to claim 1, wherein
    from among a geometric basis distance determined from an arrangement of the pad and an arrangement of the terminal and an electrical characteristic distance that is allowable from an electrical characteristic of the pad, a smallest distance is selected as the maximum allowable distance.

3. The assignment method of terminals of a semiconductor package according to claim 2, wherein
    the electrical characteristic includes at least one of characteristics of inductance, capacitance, and resistance, and
    the electrical characteristic distance includes at least one of an inductance characteristic distance in which a characteristic of inductance is allowed, a capacitance characteristic distance in which a characteristic of capacitance is allowed, and a resistance characteristic distance in which a characteristic of resistance is allowed.

4. The assignment method of terminals of a semiconductor package according to claim 1, wherein
    in extracting assigned terminal candidate, when a group of assigned terminal candidates is extracted, an assigned terminal candidate having a largest relative distance with a pad corresponding to the group of assigned terminal candidates is decided as the assigned terminal in the group of assigned terminal candidates.

5. The assignment method of terminals of a semiconductor package according to claim 1, wherein
    in the extracting, when there are a plurality of pads having a same number of the assigned terminal candidates, a pair of an assigned terminal candidate and a pad having a largest relative distance among relative distances between each of the plurality of pads and corresponding assigned terminal is extracted, and an assigned terminal candidate associated with the extracted pair is assigned to a pad associated with the pair as the assigned terminal.

6. The assignment method of terminals of a semiconductor package according to claim 1, wherein
when deciding the assigned terminal based on the assigned terminal candidates, the process is repeated excluding a pair of an assigned terminal candidate that has already been assigned to one of the pads and a pad.

7. A semiconductor package having in which any of a plurality of terminals provided at prescribed positions of a package substrate to which the semiconductor chip is jointed is assigned to each of a plurality of pads of a semiconductor chip and is wired, the semiconductor package obtained by processes comprising:
deciding a maximum allowable distance to be a constraint condition regarding a relative distance between each of the pads and a terminal to be assigned to the pad,
extracting one or a plurality of assigned terminal candidates for each of the pads so that the relative distance between each of the pads and a terminal selected for the pad falls within a range of the maximum allowable distance; and
performing a process to decide one of the terminals as a assigned terminal based on the assigned terminal candidates and assign the one of the terminals to one of the pads; wherein
in the process, one of the terminals is assigned with priority to a pad having a smallest number of assigned terminal candidates in a not-assigned condition based on the assigned terminal candidates.

8. An assigned supporting apparatus of terminals of a semiconductor package configure to assign any of a plurality of terminals provided at prescribed positions of a package substrate to which the semiconductor chip is jointed to each of a plurality of pads of a semiconductor chip, the assigned supporting apparatus comprising:
a judgment basis generating unit configured to decide a maximum allowable distance to be a constraint condition regarding a relative distance between each of the pads and a terminal to be assigned to the pad,
a candidate extracting unit configured to extract one or a plurality of assigned terminal candidates for each of the pads so that the relative distance between each of the pads and a terminal selected for the pad falls within a range of the maximum allowable distance; and
an assignment deciding unit configured to perform a process to decide one of the terminals as a assigned terminal based on the assigned terminal candidates and assign the one of the terminals to one of the pads; wherein
the process of the assignment deciding unit is a process to assign one of the terminals with priority to a pad having a smallest number of assigned terminal candidates in a not-assigned condition based on the assigned terminal candidates.

9. The assigned supporting apparatus of terminals of a semiconductor package according to claim 8, wherein
the judgment basis generating unit selects, from a geometric basis distance determined from an arrangement of the pad and an arrangement of the terminal and an electrical characteristic distance that is allowable from an electrical characteristic of the pad, a smallest distance as the maximum allowable distance.

10. The assigned supporting apparatus of terminals of a semiconductor package according to claim 9, wherein
the electrical characteristic includes at least one of characteristics of inductance, capacitance, and resistance; and
the electrical characteristic distance includes at least one of an inductance characteristic distance in which a characteristic of inductance is allowed, a capacitance characteristic distance in which a characteristic of capacitance is allowed, and a resistance characteristic distance in which a characteristic of resistance is allowed.

11. The assigned supporting apparatus of terminals of a semiconductor package according to claim 8, wherein
when the candidate extracting unit extracts decides a group of assigned terminal candidates, the assignment deciding unit extracts an assigned terminal candidate having a largest relative distance with a pad corresponding to the group of assigned terminal candidates is decided as the assigned terminal in the group of assigned terminal candidates.

12. The assigned supporting apparatus of terminals of a semiconductor package according claim 8, wherein
when there are a plurality of pads having a same number of the assigned terminal candidates, the candidate extracting unit extracts a pair of an assigned terminal candidate and a pad having a largest relative distance among relative distances between each of the plurality of pads and corresponding assigned terminal, and assign an assigned terminal candidate associated with the extracted pair to a pad associated with the pair as the assigned terminal.

13. The assigned supporting apparatus of terminals of a semiconductor package according to claim 8, wherein
when the assignment deciding unit decides the assigned terminal based on the assigned terminal candidates, the assignment deciding unit repeats the process excluding a pair of an assigned terminal candidate that has already been assigned to one of the pads and a pad.

14. A non-transitory computer readable recording medium having stored therein a program to make a computer execute processes to assign, any of a plurality of terminals provided at prescribed positions of a package substrate to which the semiconductor chip is jointed to each of a plurality of pads of a semiconductor chip, the processes comprising:
making a processing unit of a computer decide a maximum allowable distance to be a constraint condition regarding a relative distance between each of the pads and a terminal to be assigned to the pad,
making the processing unit of the computer calculate one or a plurality of assigned terminal candidates for each of the pads so that the relative distance between each of the pads and a terminal selected for the pad falls within a range of the maximum allowable distance;
making the processing unit of the computer perform a process to one of the terminals as a assigned terminal based on the assigned terminal candidates and assign the one of the terminals to one of the pads; and
making a storage unit of the computer or an output unit connected to the computer store output a result of the process; wherein
the process is a process to assign one of the terminals with priority to a pad having a number of assigned terminal candidates in a not-assigned condition that is equal to or larger than 1 and smallest based on the assigned terminal candidates.

* * * * *